United States Patent [19]

Portolese

[11] 4,334,598
[45] Jun. 15, 1982

[54] DISC BRAKE ASSEMBLY AND RESILIENT MEMBER THEREFOR

[75] Inventor: Larry A. Portolese, Granger, Ind.

[73] Assignee: The Bendix Corporation, Southfield, Mich.

[21] Appl. No.: 155,356

[22] Filed: Jun. 2, 1980

[51] Int. Cl.³ ............................................. F16D 65/02
[52] U.S. Cl. .............................. 188/73.44; 188/73.31; 188/196 P
[58] Field of Search .................. 188/71.8, 72.3, 73.36, 188/73.44, 73.45, 73.31, 196 P

[56] References Cited

U.S. PATENT DOCUMENTS 4,193,481  3/1980  Wunderlich ..................... 188/71.8
4,265,340  5/1981  Scott et al. ..................... 188/73.3

Primary Examiner—Duane A. Reger
Attorney, Agent, or Firm—Paul David Schoenle; Ken C. Decker

[57] ABSTRACT

A disc brake includes a pair of friction elements which cooperate with a caliper (26) to engage a rotor (10). A torque plate (12) movably supports the caliper via at least one pin (24). The pin is received with an aperture (40) on the caliper and a resilient member (44) within the aperture accommodates the clearance between the pin and caliper. The resilient member defines at least one rib (54 or 56) substantially disposed outside the aperture. The rib is deformable axially to generate a restoring force biasing the caliper and at least one of the pair of friction elements to return to a rest position.

1 Claim, 5 Drawing Figures

DISC BRAKE ASSEMBLY AND RESILIENT MEMBER THEREFOR

The invention relates to a disc brake wherein a pin extends between a torque plate and a caliper to movably support the caliper relative to the torque plate. The caliper cooperates with a pair of friction elements to urge the latter into engagement with a rotor during braking. An aperture in the caliper receives the pin and a resilient member is disposed within the aperture to take up any clearances between the pin and the wall of the aperture.

During braking the pair of friction elements is engageable with the rotor to retard rotation of the latter. Upon termination of braking, the rotation of the rotor knocks back the friction elements to return the caliper to its non-braking or rest position. However, with the resilient member tightly engaging the pin within the caliper aperture, the caliper is prevented from moving an adequate distance to generate sufficient running clearance between the rotor and the pair of frictioin elements. Consequently, the pair of friction elements slightly drag on the rotor to inhibit free rotation. This dragging adversely affects the life of the friction elements and also reduces a vehicle's mileage efficiency per gallon of fuel.

Although various "knock back" devices such as springs have been disclosed for eliminating drag in a disc brake, these devices are added parts, thereby increasing assembly time and complicating assembly of the disc brake.

The prior art is illustrated in U.S. Pat. Nos. Re. 26,746, 3,375,906, 3,482,655 and 3,930,564.

The invention provides a remedy for the above problem. The resilient member carried within the aperture of the caliper defines an opening for receiving the pin. The pin is secured to the torque plate and movably supports the caliper relative to the torque plate. The resilient member includes at least one rib extending inwardly to engage the pin. The one rib is axially disposed on the resilient member at a location spaced from the aperture, so that when the pin is inserted into the resilient member opening to engage the rib, the rib is free to expand. Moreover, the resilient member on each side of the one rib is spaced from the pin so that the rib is deformable axially during braking to remain fixedly engaging the pin. Therefore, upon termination of braking, the restoring force created by deformation of the rib biases the caliper to return to a rest position via the resilient member. When the caliper returns to its rest position, it also moves or eliminates the force on at least one of the pair of friction elements away from the rotor.

The advantages offered by the invention are that an existing part of a disc brake is slightly modified to create a retraction mode for the caliper and at least one friction element. Consequently, retraction of the caliper and one friction element is accomplished without any additional parts. In addition, the modification imposed on the existing resilient member also increases the coupling fit between the resilient member and either the caliper or torque plate.

Two ways of carrying out the invention are described in detail below with reference to the drawings, in which.

Figure 1:
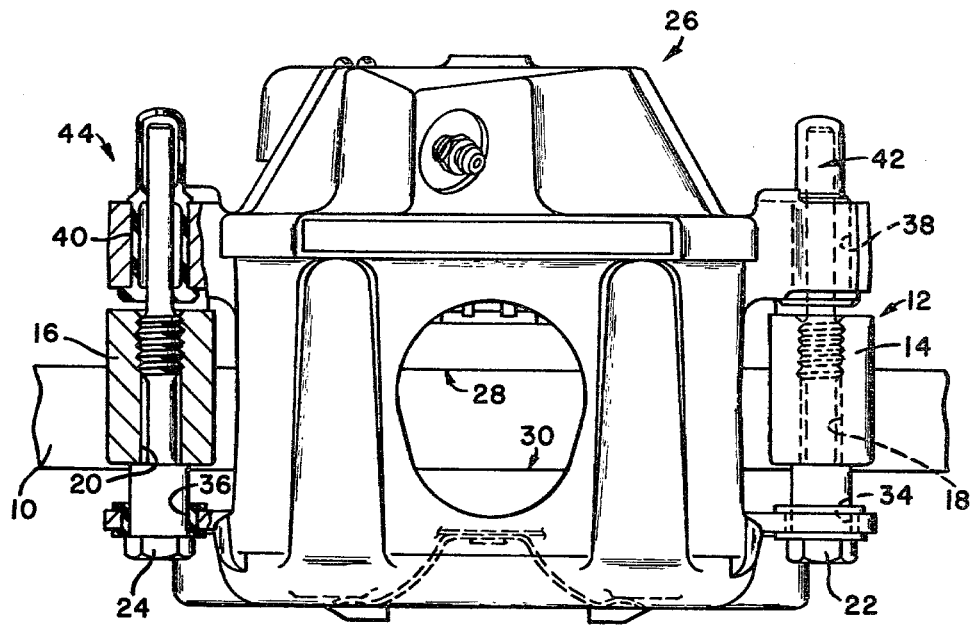
FIG. 1 is a top view of a disc brake incorporating a resilient member according to the present invention.

In the disc brake of FIG. 1, a rotor 10 is coupled to a wheel assembly of a vehicle (not shown) for rotation therewith. A torque plate or support fixture 12 is couple to a non-rotating portion of the vehicle and is disposed adjacent the rotor. The torque plate 12 includes torque taking arms 14 and 16 which are threadably apertured at 18 and 20 to releasably receive pins 22 and 24. The pins extend from one side of the torque plate to slidably engage a caliper 26 in a manner hereinafter described. An inner friction element 28 is carried by the torque plate 12 while an outer friction element 30 is carried by the caliper 26. A spring 32 resiliently attaches the outer friction element to the caliper 26. The outer friction element is provided with a pair of openings 34 and 36 for movably receiving the pair of pins, respectively.

In accordance with the invention, the caliper 26 is provided with circumferentially spaced apertures 38 and 40 and resilient members 42 and 44 are disposed within the apertures. As one resilient member is identical to the other, only the structure and operation of resilient member 44 will be described in detail. Turning to the enlarged view of FIG. 2, the resilient member is substantially U-shaped to define an opening 45 for receiving pin 24. A pair of tabs 46 and 48 extend outwardly to form abutments 50 and 52 engageable with the caliper 26. The tabs are annular to surround the aperture 40 thereby coupling the resilient member 44 to the caliper 26. A pair of ribs 54 and 56 extend inwardly to engage the pin 24. It is essential that the ribs cooperate with the pin to define a cavity 58 which is substantially confined to the aperture 40. Consequently, the pin 24 is spaced from the resilient member 44 within the aperture 40 when the caliper is in the rest position of FIG. 2. The pair of ribs 54 and 56 are specifically located at an axial position within the opening 45 to substantially align with the pair of tabs 46 and 48. In other words, the caliper 26 includes surfaces 59 and 60 which define planes normal to the pin 24 and these plane substantially define an inner boundary for the pair of ribs 54 and 56. A cap or sleeve 62 extends axially from the tab and rib, 48 and 56, to enclose the end of pin 24. A small opening 64 at the end of the sleeve vents the space between the end of the pin and the sleeve to atmosphere.

Figure 3:
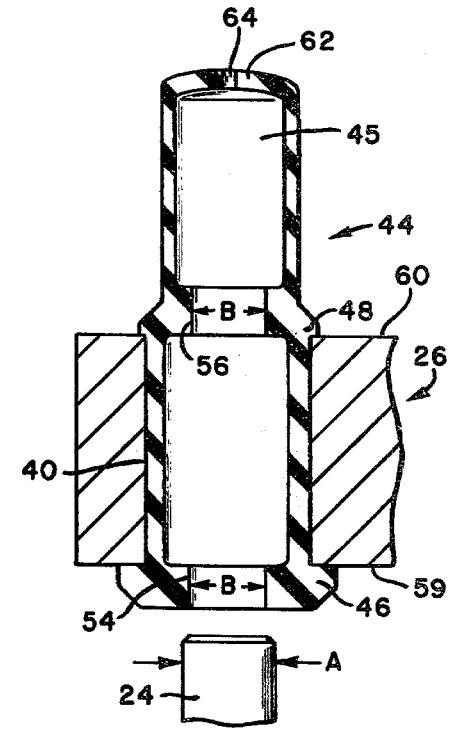
FIG. 3 is an exploded view of FIG. 2.

Turning to FIG. 3, the pin 24 defines a diameter A which is greater than the diameter B formed by ribs 54 and 56. Consequently, when the pin 24 is inserted into the opening 45, the ribs will be expanded outwardly thereby causing the tabs 46 and 48 to also expand slightly. The expansion of the ribs is possible because of their position outside the aperture 40. In addition, the engagement between the ribs and pin is sufficiently tight so that the radially inner portion of the ribs will remain fixed to the pin even though the caliper and remaining portion of the resilient member will move relative to the pin. Therefore, the ribs will be deformed axially when the caliper moves relative to the pin to generate a restoring force biasing the caliper to return to the rest position via the resilient member.

Figure 4:
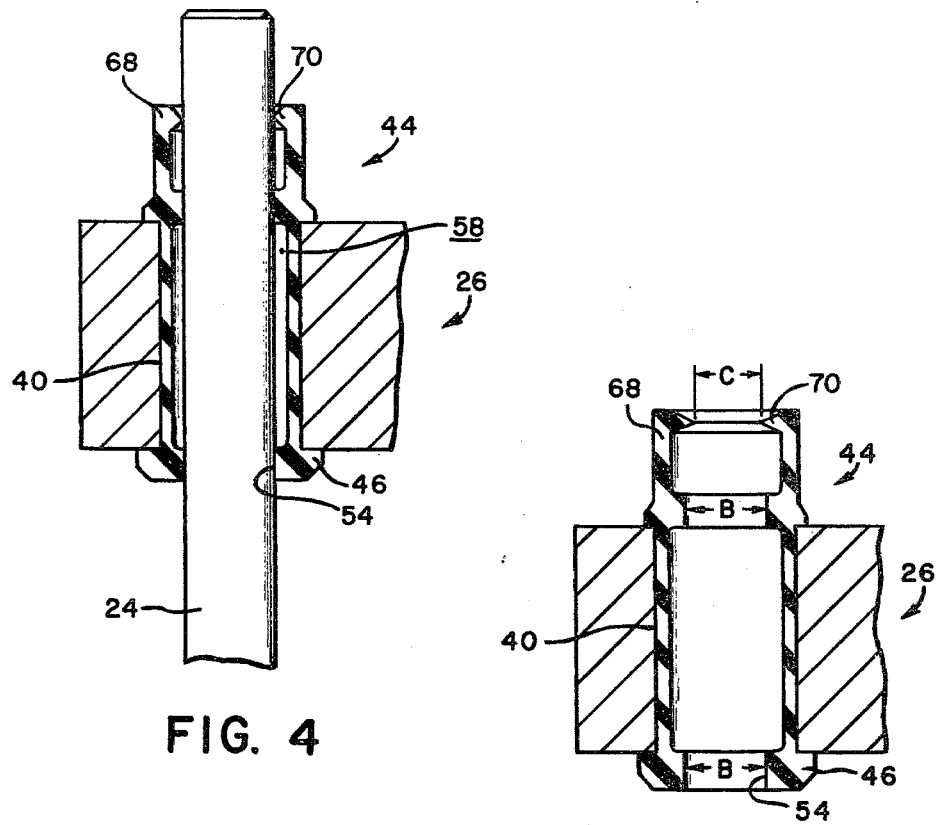
FIG. 4 is a view similar to FIG. 2 showing a second mode for carrying the invention.
Figure 5:
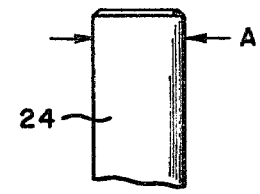
FIG. 5 is an exploded view of FIG. 4.

In FIGS. 4 and 5 an optional secondary sleeve 68 extends axially from the tab and rib 48 and 56. The sleeve 68 leads to an inwardly extending flange 70 which is slightly engageable with the pin 24. The diameter C formed by the flange 70 is greater than the diameter B but less than the diameter A. Consequently, the ribs 46 and 48 remain fixed to the pin when the caliper and resilient member move relative to the pin and the flange 70 is movable with the caliper and resilient member relative to the pin. The flange slidably engages the pin to protect that portion of the pin extending into the cavity 58.

Figure 2:
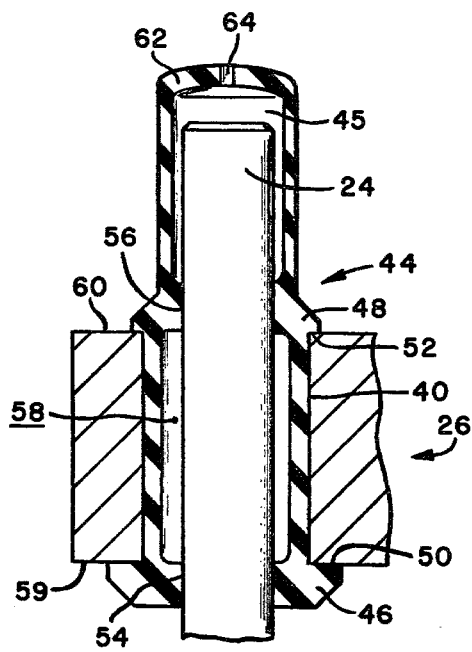
FIG. 2 is an enlarged view of the partial cutout shown in FIG. 1.

With both embodiments it is seen that when the caliper moves relative to the pin during braking, all of the resilient member 44 except the portion of the ribs engaging the pin, moves with the caliper. Consequently, the ribs are deformed axially to generate a restoring force. For example, during braking, the caliper 26 and resilient member 44 in FIG. 2 move upwardly while that portion of the ribs 54 and 56 in engagement with pin 24 remains substantially fixed to the pin 24. The aperture 40 of the caliper is moved to overlap a portion of the rib 56 and to move away from the rib 54. When braking is terminated, the deformed ribs 54 and 56 bias the resilient member and the caliper to return to their rest position, as seen in FIG. 2.

There are many variations to the present invention. For example, both sleeves 62 and 68 could be eliminated without detracting from the present invention. Also, the resilient member 44 could be disposed within an aperture on the torque plate if the pin threadably engages the caliper. And, the pair of ribs could partially align with the aperture of the caliper provided a substantial portion of the ribs is outside the aperture in alignment with the respective tabs. Other modifications by those skilled in the art are also included within the scope of the appended claims.

I claim:

1. In a disc brake, a torque plate disposed adjacent a rotor to be braked, a pair of friction elements disposed on opposite sides of the rotor, a caliper cooperating with the pair of friction elements to bias the latter into engagement with the rotor during braking, a pin extending between the torque plate and the caliper to movably support the caliper relative to the torque plate, the caliper including an aperture for receiving the pin, and a resilient member carried by the caliper within the aperture to accommodate a clearance between the pin and the wall of the aperture, characterized by said resilient member including an opening for receiving said pin, said resilient member also including a pair of inwardly extending ribs being disposed at an axial location within said opening spaced from but substantially adjacent the aperture, said pair of ribs cooperating with said pin to define an annular cavity within the aperture so as to maintain said pin in spaced relation to said resilient member within the aperture, said pair of ribs fixedly engaging said pin to move with said pin when said caliper moves relative to said pin during braking, one of said pair of ribs moving with said pin to deflect into the aperture during braking so that the wall of the aperture maintains a tight engagement between said one rib and said pin, the tight engagement providing for retraction of the caliper by said one rib upon termination of braking, and said resilient member further including a cap substantially enclosing said pin but remaining spaced therefrom to avoid interferring with movement between said pin and said resilient member.

* * * * *